(12) United States Patent
Clarke et al.

(10) Patent No.: US 6,986,966 B2
(45) Date of Patent: *Jan. 17, 2006

(54) BATTERY WITH BIFUNCTIONAL ELECTROLYTE

(75) Inventors: Robert Lewis Clarke, Orinda, CA (US); Brian J. Dougherty, Menlo Park, CA (US); Stephen Harrison, Shawnigan, CA (US); J. Peter Millington, Weaverham (GB); Samaresh Mohanta, Fremont, CA (US)

(73) Assignee: Plurion Systems, Inc., Reno, NV (US)

( * ) Notice: Subject to any disclaimer, the term of this patent is extended or adjusted under 35 U.S.C. 154(b) by 78 days.

This patent is subject to a terminal disclaimer.

(21) Appl. No.: 10/418,678

(22) Filed: Apr. 17, 2003

(65) Prior Publication Data

US 2004/0029019 A1    Feb. 12, 2004

Related U.S. Application Data

(63) Continuation-in-part of application No. PCT/US01/41678, filed on Aug. 10, 2001.

(60) Provisional application No. 60/373,733, filed on Apr. 17, 2002.

(51) Int. Cl.
    *H01M 6/48*    (2006.01)

(52) U.S. Cl. .............. 429/210; 429/344; 429/225; 429/224; 429/218.1; 429/231.5; 429/229; 429/105; 429/347

(58) Field of Classification Search ............... 429/347, 429/105, 229, 210, 344, 225, 224, 218.1, 429/231.5
    See application file for complete search history.

(56) References Cited

U.S. PATENT DOCUMENTS

| | | | |
|---|---|---|---|
| 3,811,946 A | 5/1974 | Creutz et al. | 429/101 |
| 4,279,978 A | 7/1981 | Dodin et al. | 429/248 |
| 5,558,754 A | 9/1996 | Karcher | 205/431 |
| 6,242,135 B1 | 6/2001 | Mushiake | 429/304 |
| 6,692,862 B1 * | 2/2004 | Zocchi | 429/105 |
| 2004/0202939 A1 * | 10/2004 | Clarke et al. | 429/229 |

OTHER PUBLICATIONS

Iwasa et al. "Fundamental studies on the electrolyte solutions of novel redox flow battery for electricity storage", 2001.*

Fang, B. et al., *Stidy of the Ce(III)/Ce(IV) redox couple for redox flow battery application*, Electronchimica Acta 47 (2002) pp. 3971-3976, especially pp. 3975-3976.

* cited by examiner

Primary Examiner—Laura Weiner
(74) Attorney, Agent, or Firm—Rutan & Tucker, LLP

(57) ABSTRACT

A battery comprises an acid electrolyte in which a compound provides acidity to the electrolyte and further increases solubility of at least one metal in the redox pair. Especially preferred compounds include alkyl sulfonic acids and alkyl phosphonic acids, and particularly preferred redox coupled include $Co^{3+}/Zn^0$, $Mn^{3+}/Zn^0$, $Ce^{4+}/V^{2+}$, $Ce^{4+}/Ti^{3+}$, $Ce^{4+}/Zn^0$, and $Pb^{4+}/Pb^0$.

20 Claims, 1 Drawing Sheet

US 6,986,966 B2

BATTERY WITH BIFUNCTIONAL ELECTROLYTE

This application is a continuation-in-part of international patent application with the serial number PCT/US01/41678, filed Aug. 10, 2001 (published as WO 03/017407 on Feb. 27, 2003), and further claims the benefit of U.S. provisional patent with Ser. No. 60/373,733, filed Apr. 17, 2002, both of which are incorporated herein by reference.

FIELD OF THE INVENTION

The field of the invention is batteries, and especially redox flow cells.

BACKGROUND OF THE INVENTION

Many types of batteries and other power cells are known, based upon a relatively wide range of electrical couples. Among the most popular electrical couples are those containing zinc. Zinc is regarded as the highest energy couple component that can be cycled in an aqueous room temperature battery and is therefore commonly used in numerous battery and power cell applications. Depending on the type of coupling partner such zinc containing batteries will exhibit various characteristic properties.

For example, zinc is coupled with carbon in most simple flashlight batteries to provide a relatively inexpensive and reliable power source. Although manufacture of Zn/C batteries is generally simple and poses only relatively little environmental impact, various disadvantages of Zn/C batteries exist. Among other things, the ratio of power to weight in commonly used Zn/C batteries is relatively poor. To improve the ratio of power to weight, alternative coupling partners and systems can be employed. For example, zinc can be coupled with mercury oxide or silver to achieve an improved power to weight ratio. However, the toxicity of mercury oxide is frequently problematic in manufacture and tends to become even more problematic when such batteries are discarded. On the other hand, while silver as a coupling partner for zinc is environmentally substantially neutral and significantly improves the power to weight ratio, the use of silver is in many instances economically prohibitive.

In still further known batteries and power cells, zinc is coupled with still other metals such as nickel or copper to provide a specific desired characteristic. However, and depending on the particular metal, new disadvantages may arise and particularly include environmental problems with manufacture and/or disposal, relatively low power to weight ratio, and undesirably low open circuit voltage.

Moreover, halogens may be employed as a coupling partner for zinc, and most common zinc-halogen couples include zinc-bromine and zinc-chloride (e.g., for load leveling batteries). However, such battery configurations are often difficult to integrate into portable or miniaturized devices Moreover, such battery configurations typically require pumping systems and are often prone to leakage leading to significant problems due to the highly corrosive nature of the halogen-containing electrolyte.

Alternatively, oxygen may be employed as a gaseous coupling partner for zinc, thereby generally avoiding problems associated with toxicity, excessive cost for coupling partners, or spillage. Among the various advantages in this configuration, using air (i.e., oxygen) as coupling partner for zinc typically results in a relatively high power to weight ratio. Moreover, the zinc-oxygen system typically provides a relatively flat discharge curve. However, reasonable shelf life of such batteries can often only be achieved by using an airtight seal. Furthermore, to provide continuous operation, air must have an unobstructed path through the battery to the cathode so that the-oxygen in the air is available to discharge the cathode. Moreover, commercial applications of zinc-air batteries have previously been limited to primary or non-rechargeable types.

An additional problem with zinc-air batteries often arises from the use of an alkaline electrolyte, which is typically disposed between a porous zinc anode and an air cathode formed of a carbon membrane. Unfortunately, the use of alkaline electrolytes in such electrodes frequently leads to absorption of carbon dioxide, and consequently formation of carbonates, which in turn tend to reduce conductivity and clog the pores in the active surfaces of the electrodes.

Thus, although there are numerous coupling partners for zinc in batteries and power cells known in the art, all or almost all of them suffer from one or more disadvantage. Therefore, there is still a need to provide compositions and methods for improved batteries.

SUMMARY OF THE INVENTION

The present invention is directed to a battery having a bifunctional acid electrolyte in which a compound (a) provides acidity to the acid electrolyte, and (b) increases the solubility of at least one metal ion of a redox couple that provides the current in the battery.

In one aspect of the inventive subject matter, the acid electrolyte is an aqueous electrolyte and especially contemplated compounds include organic acids. Particularly preferred organic acid include alkyl sulfonic acids (e.g., methane sulfonic acid) and alkyl phosphonic acids (e.g., methane phosphonic acid).

In another aspect of the inventive subject matter, the redox couple includes a first metal and a second metal (which may be present in an ionic form or elemental form), and at least one of the metals is a cobalt ion, manganese ion, cerium ion, vanadium ion, titanium ion, lead ion, or a zinc ion. However, particularly preferred redox couples include $Co^{3+}/Zn^0$, $Mn^{3+}/Zn^0$, $Ce^{4+}/V^{2+}$, $Ce^{4+}/Ti^{3+}$, $Ce^{4+}/Zn^0$, and $Pb^{4+}/Pb^0$.

In a further aspect of the inventive subject matter, contemplated batteries may be employed as primary or secondary batteries, and may have a wide range of capacities (e.g., at least 10 Wh to 100,000 kWh, and even more). Especially where contemplated batteries have a relatively high capacity, it is contemplated that such batteries include an anolyte reservoir and a catholyte reservoir in fluid communication with the battery cell, and at least some of the cells may include a bipolar electrode.

Various objects, features, aspects, and advantages of the present invention will become more apparent from the following detailed description of preferred embodiments of the invention, along with the accompanying drawing.

DETAILED DESCRIPTION

Figure 1:
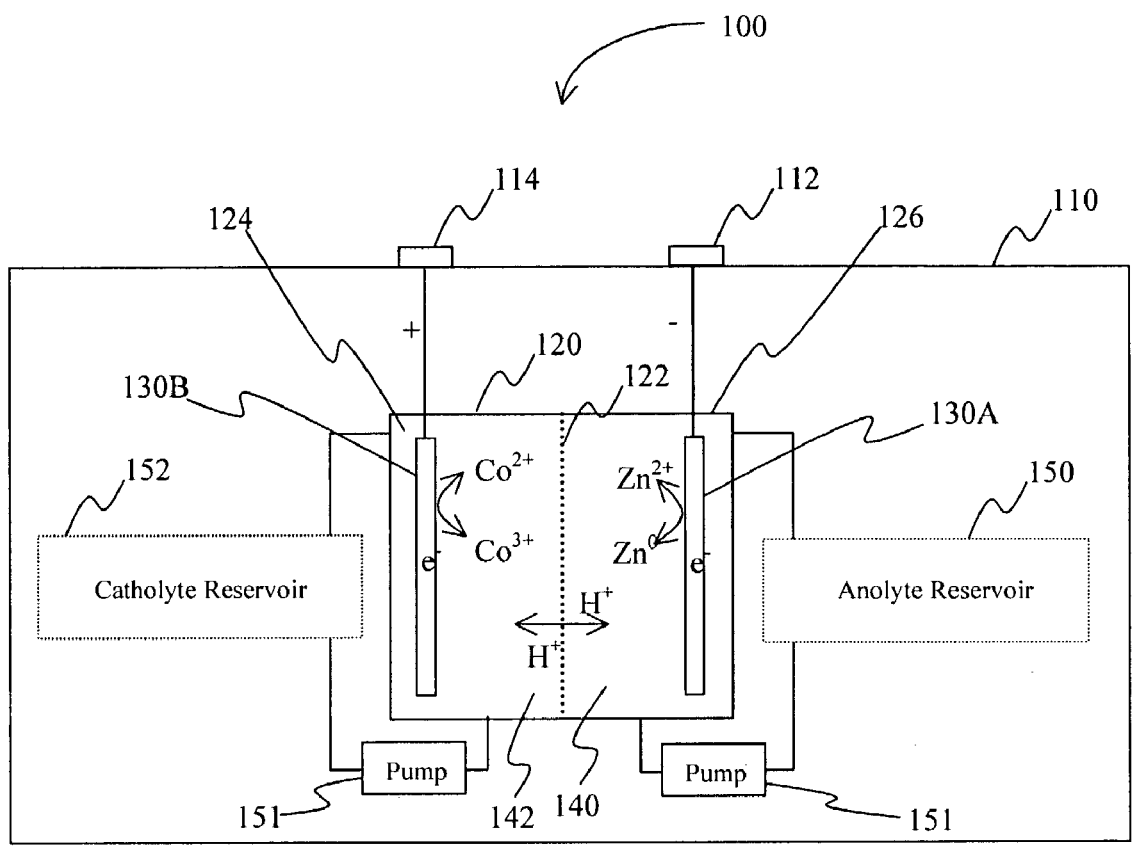
FIG. 1 is a schematic view of an exemplary battery according to the inventive subject matter.

The inventors have discovered that a battery may be produced in which an acid electrolyte has compound that provides (a) acidity to the electrolyte, and (b) increases the solubility of at least one metal ion of the metals that form the redox pair. Viewed from another perspective, the inventors discovered that compounds that increase solubility of selected metals (and especially in ionic form) in the electrolyte will advantageously allow use of redox couples that would otherwise be regarded unsuitable redox couples in a battery (and particularly a secondary battery) having an acid electrolyte.

As used herein, the term "acid electrolyte" refers to an electrolyte (i.e., a solution that conducts electricity) having a pH of less than 7.0, and more typically of less than 4.0. As also used herein, the term "redox pair" is interchangeably used with the term "redox couple" and refers to a combination of a first element (or ion of the first element) and second element (or ion of the second element) in a battery, in which reduction of the first element and oxidation of the second element produce the current provided by the battery. Most preferably, the first and second elements in the redox couple are different, and where the first and second elements of the redox pair are the same (with different oxidation states), a redox pair formed by $V^{+5}/V^{+2}$ is specifically excluded.

As further used herein, the term "anode" refers to the negative electrode of a battery (i.e., the electrode where oxidation occurs) during discharge of the battery. Thus, the term "anode compartment" refers to the battery compartment that includes the anode, and the term "anolyte" refers to the electrolyte in the anode compartment. Similarly, the term "cathode" refers to the positive electrode of a battery (i.e., the electrode where reduction occurs) during discharge of the battery. Thus, the term "cathode compartment" refers to the battery compartment that includes the cathode, and the term "catholyte" refers to the electrolyte in the cathode compartment.

As still further used herein the term "the compound increases solubility of a metal ion" in an electrolyte means that the solubility of the metal ion in the electrolyte comprising the compound is at least 5% higher, more typically at least 20% higher, and even more typically at least 50% higher than the solubility of the same metal ion in the same electrolyte at the same pH without the compound. For example, while $Ce^{3+}$ has only marginal solubility in aqueous sulfuric acid, $Ce^{3+}$ has a solubility of more than 100 g (as cerium carbonate) in an aqueous solution of about 50% (vol.) methane sulfonic acid.

In one preferred battery configuration, the redox couple is formed by zinc and cobalt in an acidic electrolyte wherein the acid electrolyte includes methane sulfonic acid to provide acidity of the electrolyte and to increase solubility of the $Zn^{2+}$, $Co^{3+}$, and/or $Co^{2+}$ in the acid electrolyte. Based on previous experiments (infra), such redox couples have an open circuit voltage of about 2.6 Volt, which is superior to numerous other redox couples. In such configurations, the inventors contemplate that zinc will be dissolved into solution on discharge of the battery and plated onto the electrode during charging following the equation (I) below. On the other electrode cobalt ions will donate/receive electrons following the equation (II) below.

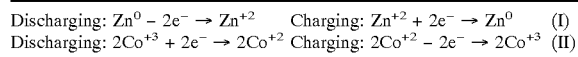

Discharging: $Zn^0 - 2e^- \rightarrow Zn^{+2}$  Charging: $Zn^{+2} + 2e^- \rightarrow Zn^0$  (I)
Discharging: $2Co^{+3} + 2e^- \rightarrow 2Co^{+2}$ Charging: $2Co^{+2} - 2e^- \rightarrow 2Co^{+3}$ (II)

Contemplated batteries will thus advantageously employ an acid electrolyte, and especially preferred acid electrolytes include organic acids. It is further generally preferred that contemplated organic acids (a) have a relatively high solubility in aqueous or non-aqueous medium, and (b) increase the solubility of at least one of the metals of the redox pair in ionic form. While not wishing to be bound by any particular hypothesis or theory, the inventors contemplate that the increase in solubility is at least in part due to complex formation of the metal ion with the anion of the organic acid (e.g., salt formation).

Particularly preferred organic acids include those that are able to dissolve metal ions, and especially $Co^{+3/+2}$, $Mn^{+3/+2}$, $Ce^{+4/+3}$, $Pb^{+4/+2}$, $Ti^{+3/+4}$, $V^{+2}$, and $Zn^{+2}$ at a relatively high concentration (e.g., greater than 0.1M, more preferably greater than 0.25M, even more preferably greater than 0.5M, and most preferably greater than 0.7M, which will at least in part depend on the type of organic acid in the electrolyte and the particular metal ion). Therefore, especially contemplated organic acids will include various alkyl sulfonic acids and various alkyl phosphonic acids. The term "alkyl" as used herein refers to all hydrocarbon radicals (including linear, branched, and cyclic), which may in many cases have a general formula $C_nH_{2n+1}$. Also included in the term "alkyl" are hydrocarbons in which one or more H atoms are substituted with a non-H atom (e.g., a halogen, alkyl, aryl, carboxylic acid, sulfonyl, or phosphonyl). For example, methyl sulfonic acid may be employed where it is desired that the electrolyte is biodegradable and/or is a significantly less strong oxidant (e.g., as compared to sulfuric acid). On the other hand, alternative organic acids may also include trifluoromethane sulfonic acid ($CF_3SO_3H$), which is thought to make a better solvent anion than methane sulfonic acid for various metal ions (e.g., ceric ions). Still further contemplated compounds also include inorganic acids such as perchloric acid ($HClO_4$), nitric acid, hydrochloric acid (HCl), or sulfuric acid ($H_2SO_4$). However, such alternative acids may impose safety concerns or exhibit less advantageous capability to dissolve high concentrations of contemplated metal ions.

With respect to the concentration of the compound (e.g., the organic acid) it should be appreciated that a particular concentration is not limiting to the inventive subject matter. However, especially preferred concentrations will generally be relatively high (i.e., at least 0.1M, and more typically more than 1M). For example, where the organic acid is methane sulfonic acid (MSA), suitable concentrations will be in the range of between 1M and 4M, and more preferably between 2.5M and 3.5M.

Similarly, it is generally contemplated that the cobalt ion concentration may vary considerably, and contemplated concentrations will be in the range of between 0.1–1 mM (and even less) to the maximum saturation concentration of the cobalt ion in the +2 and/or +3 oxidation state. However, it is typically preferred that the cobalt ion concentration in the electrolyte is at least 0.05M, more preferably at least 0.1M, and most preferably at least 0.3M. Viewed from another perspective, it is contemplated that preferred cobalt ion concentrations lie within 5–95% of the solubility maximum of cobalt ions in the electrolyte at a pH<7 and 20° C.

It is further contemplated that the cobalt ions may be introduced into the electrolyte in various forms. However, it is preferred that cobalt ions are added to the electrolyte solution in form of cobalt carbonate. Numerous alternative forms, including cobalt acetate, or cobalt sulfate are also contemplated. Similarly, the concentration of zinc ions in the electrolyte may vary considerably, but will preferably be at least 0.3M, more preferably at least 0.8M, and most preferably at least 10.2M. With respect to the particular form of zinc addition to the electrolyte, the same considerations as described above apply. Thus, contemplated zinc forms include zinc carbonate, zinc acetate, zinc nitrate, etc. Where the second metal can be introduced in non-ionic form, it is contemplated that such metals (and particularly zinc and/or lead) may be introduced as a film or plate on the electrode (typically anode).

In an exemplary zinc/cobalt redox system using an aqueous solution of methane sulfonic acid, it is contemplated that the following reactions occur during charging (the reactions are reversed on discharge):

Cathode: $2Co(CH_3SO_3)_2 + 2CH_3SO_3H \rightarrow 2Co(CH_3SO_3)_3 + 2H^+$
Anode: $Zn(CH_3SO_3)_2 + 2H^+ \rightarrow Zn^0 + 2CH_3SO_3H$ Written in another form:

$2Co^{+2} - 2e^- \rightarrow 2Co^{3+}$ (on charging $E° = +1.92$ Volt)
$Zn^{2+} + 2e^- \rightarrow Zn^0$ (on charging $E° = -0.79$ volts)

Thus, it should be recognized that only hydrogen ions are moving through the membrane (i.e., the separator) in a battery during charge and discharge. Consequently, particularly contemplated membranes include those that allow flow of hydrogen but limit and/or prevent exchange of other components of the electrolyte across the membrane. There are numerous such membranes known in the art, and all of those are deemed suitable for use in conjunction with the teachings presented herein. However, a particularly preferred membrane includes a NAFION™ membrane (NAFION™: perfluorosulfonic acid—PTFE copolymer in the acid form; commercially available from DuPont, Fayetteville, N.C.).

FIG. 1 depicts an exemplary battery 100 with a housing 110 and contacts 112 and 114. Contacts 112 and 114 are in electrical communication with the respective electrodes 130A and 130B, which are disposed in at least one battery cell 120. The cell 120 is divided by separator 122 (e.g., NAFION™ membrane) into compartment 124 and compartment 126. Compartment 124 includes electrode 130B that is disposed in the electrolyte 142 (e.g., comprising MSA) containing $Co^{+2}$ and $Co^{+3}$ ions, while compartment 126 includes electrode 130A that is disposed in the electrolyte 140 (e.g., comprising MSA) containing zinc ions (zinc in non-ionic metallic form is typically plated onto the electrode). The housing may further comprise anolyte and catholyte reservoirs 150 and 152, respectively, which are in fluid communication with the respective compartments via lines and an optional pump 151.

In especially contemplated alternative aspects of the inventive subject matter, it is contemplated that the metal in the catholyte need not be limited to cobalt ions, and numerous alternative metal ions are also considered suitable for use herein. However, particularly preferred metals in the redox pairs include manganese ions, cerium ions, vanadium ions, titanium ions, lead and lead ions, zinc, and zinc ions. Where such metals and metal ions are employed, it is particularly preferred that the redox pair is $Co^{3+}/Zn^0$, $Mn^{3+}/Zn^0$, $Ce^{4+}/V^{2+}$, $Ce^{4+}/Ti^{3+}$, $Ce^{4+}/Zn^0$, or $Pb^{4+}/Pb^0$ (Table 1 below lists the calculated and/or observed open cell voltage (OCV) of such couples).

TABLE 1

| REDOX PAIR | OCV (VOLT) | PERFORMANCE |
| --- | --- | --- |
| $Co^{3+}/Zn^0$ | 2.6 | Stable charge/discharge over multiple cycles, no zinc dendrites |
| $Mn^{3+}/Zn^0$ | 2.2 | Stable charge/discharge over multiple cycles, no zinc dendrites |
| $Ce^{4+}/V^{2+}$ | 2.0 | Stable charge/discharge over multiple cycles |
| $Ce^{4+}/Ti^{3+}$ | 2.2 | Oxygen-free or depleted environment preferred, Stable charge/discharge over multiple cycles |
| $Ce^{4+}/Zn^0$ | 2.4 | Stable charge/discharge over multiple cycles, no zinc dendrites |
| $Pb^{4+}/Pb^0$ | 2.0 | Stable charge/discharge over multiple cycles |

Still further contemplated battery configurations suitable in conjunction with the teachings presented herein are described in our co-pending international patent applications with the serial numbers PCT/US01/41678 (filed Aug. 10, 2001), PCT/US02/04749 (filed Feb. 12, 2002), PCT/US02/05145 (filed Feb. 12, 2002), PCT/US02/04740 (filed Feb. 12, 2002), PCT/US02/04738 (filed Feb. 12, 2002), and PCT/US02/04748 (filed Feb. 12, 2002), each of which is incorporated by reference herein.

In still further alternative aspects, and especially depending on the particular nature of the redox pair, it should be appreciated that the acid electrolyte may be an aqueous electrolyte or a non-aqueous electrolyte. For example, where the electrolyte is an aqueous electrolyte, and the acidifying component is an organic acid, it is contemplated that he acid anion (i.e. the acid in deprotonated form) may act as counter ions for at least one of the metal ions in the redox pair. On the other hand, and especially where available, it is contemplated that complexing agents (e.g., cyclic polyaminocarboxylate ligands, hexaazamacrocyclic ligands, etc.) may be employed to increase solubility of at least one of the metal ions in the redox pair.

In a still further contemplated aspect of the inventive subject matter, and especially where it is desirable to obtain a relatively high current efficiency of zinc plating during charging, it is preferred that indium is added to the electrolyte to significantly increase the hydrogen overpotential. Addition of indium is thought to act as a barrier to hydrogen evolution, thereby forcing zinc deposition upon charging of the battery. While addition of indium to alkaline electrolytes has been previously shown to reduce hydrogen the hydrogen overpotential, the inventors surprisingly discovered that zinc deposition in an acid electrolyte in the presence of indium ions was almost 95% efficient compared to 70–80% without indium (at less than 1% substitution of indium ions for zinc ions in the electrolyte).

Of course, it should be recognized that reduction of the hydrogen overpotential in contemplated batteries need not be limited to addition of indium to the electrolyte at a particular concentration, but various alternative elements (typically metals, most typically group 13 elements) at numerous other concentrations are also contemplated. For example, suitable elements include bismuth (Bi), tin (Sn), gallium (Ga), thallium (Tl), and various oxides, including diindium trioxide ($In_2O_3$), dibismuth trioxide ($Bi_2O_3$), tin oxide (SnO) and digallium trioxide ($Ga_2O_3$). With respect to the concentration of metals and other hydrogen overpotential reducing compounds, it is generally preferred that the concentration is less than 5 mol % (relative to Zn), more typically less than 2 mol % (relative to Zn), and even more typically less than 1 mol % (relative to Zn). However, and especially where such elements or other compounds exhibit a relatively high solubility, concentrations of more than 5 mol % (relative to Zn) are also considered suitable.

In yet further alternative aspects of the inventive subject matter, it is contemplated that suitable batteries may be configured in a battery stack in which a series of battery cells are electrically coupled to each other via a bipolar electrode. The particular nature of the bipolar electrode is not limiting to the inventive subject matter, and it is generally contemplated that any material that allows for oxidation of cobalt, manganese, cerium, and/or lead ions during charging (and the reverse reaction during discharge) is suitable for use herein. However, a particularly preferred material for a bipolar electrode is glassy carbon.

Figure 2:
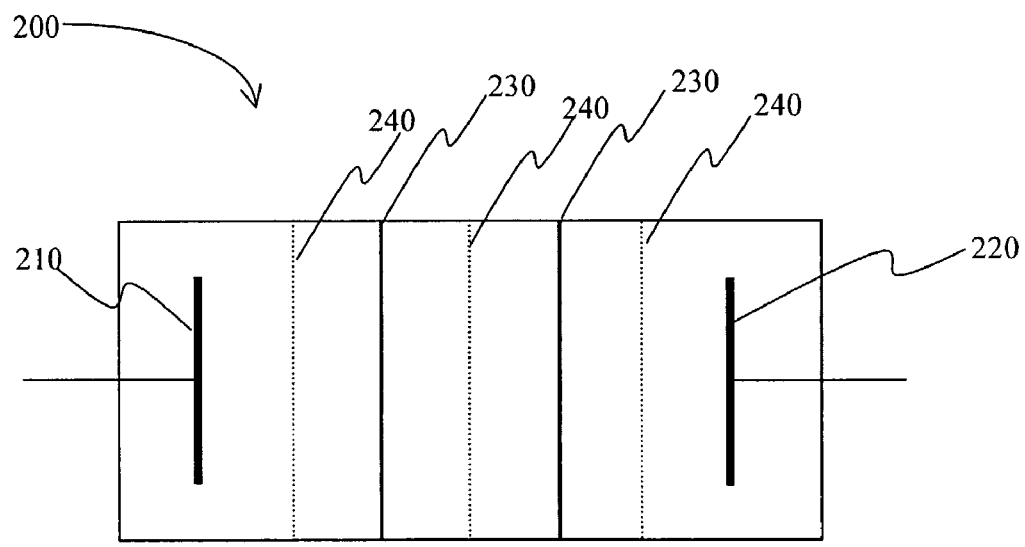
FIG. 2 is a schematic view of an exemplary battery configuration including a plurality of cells.

The inventors surprisingly discovered that glassy carbon provides, despite operation in a highly acidic electrolyte, an excellent substrate for plating of zinc during charging. Furthermore, glassy carbon is a relatively inexpensive and comparably lightweight material, thereby further improving the ratio of cost/weight to capacity. An exemplary stacked battery configuration is depicted in FIG. 2 in which the battery 200 has a cathode 210 and an anode 220, and wherein a plurality of diaphragms 240 separate the battery in a plurality of cells. Each of the cells (excluding the cells that comprise the anode or cathode) includes a bipolar electrode 230. Further contemplated aspects of bipolar electrodes are disclosed in U.S. patent application Ser. No. 10/366,118, filed Feb. 12, 2003, which is incorporated by reference herein.

Similarly, while in some battery configurations a NAFION™ membrane may operate more satisfactorily than other membranes, it is generally contemplated that the exact physical and/or chemical nature of the membrane is not limiting to the inventive subject matter so long as such membranes allow $H^+$ exchange between an anode and cathode compartment in contemplated acidic electrolytes. Consequently, it should be appreciated that numerous alternative membranes other than NAFION™ are also suitable, and exemplary membranes include all known solid polymer electrolyte membranes, or similar materials. Furthermore, it should be especially recognized that in at least some of the contemplated batteries membranes are suitable for use even if such membranes exhibit some leakage or permeability for catholyte and/or anolyte into the opposite compartment, since contemplated batteries are operable even under conditions in which the electrolytes are mixed (supra).

In yet further contemplated aspects of the inventive subject matter, it should be recognized that the capacity of contemplated batteries is typically limited only by the supply of the anolyte and catholyte. Therefore, it is contemplated that particularly useful applications include relatively small batteries with a capacity of at least 10 kWh, but also relatively large batteries (e.g., load leveling batteries at power substations and commercial/industrial locations) with a capacity of at least 100,000 kWh. Furthermore, it should be appreciated that contemplated battery configurations will lend themselves particularly well for secondary batteries. However, it should be recognized that contemplated electrolytes and battery configurations may also be employed for primary batteries.

Thus, in one preferred aspect of the inventive subject matter, the inventors contemplate a secondary battery with an acid electrolyte in which a first and second metal ion form a redox couple that produces current provided by the battery, wherein the electrolyte comprises an alkyl sulfonic acid (most preferably MSA), and wherein the redox couple is selected from the group consisting of $Co^{3+}/Zn^0$, $Mn^{3+}/Zn^0$, $Ce^{4+}/V^{2+}$, $Ce^{4+}/Ti^{3+}$, $Ce^{4+}/Zn^0$, and $Pb^{4+}/Pb^0$.

Viewed from a different and broader perspective, the inventors contemplate a battery comprising an acid electrolyte in which a compound (preferably an organic acid, and more preferably an alkyl sulfonic acid or an alkyl phosphonic acid) provides acidity to the acid electrolyte and in which the compound further increases solubility of at least one metal ion as (preferably a cobalt ion, a manganese ion, a cerium ion, vanadium ion, a titanium ion, a lead ion, or a zinc ion) compared to the electrolyte without the compound, wherein the metal ion forms with a second metal ion a redox couple that provides current of the battery.

Experiments

Rechargeable Zn—Co Battery

To validate the concept of a rechargeable battery comprising an electrolyte that includes a cobalt-zinc redox pair, a cell was constructed by using four blocks of plastic Ultra High Molecular Weight Polyethylene (UHMWP), with gaskets in between each face, two electrodes, and one NAFION™ membrane. Electrolyte inlets and outlets were made in the center sections and electrolyte was fed from two small tanks via a peristaltic pump into the respective compartments.

The cobalt solution contained 85 grams cobalt acetate in 480 ml methane sulfonic acid and 320 ml of water. The zinc solution contained 65 grams zinc carbonate in 240 ml methane sulfonic acid and 160 ml of water. The cobalt solution was fed to the cathode made of coated titanium mesh ($TiO_2$), and the zinc solution was fed to a titanium anode. Cell gap was 2.54 cm, flow rate about 2 liter per minute.

The cell was charged at 0.5 A (current density is 50 $mA/cm^2$) for five hours, further run overnight at 0.2 A current and an additional 5 hours at 0.5 A. The open circuit voltage maximum was 2.5V and the voltage across the cell during charging at 0.5 A was 2.6V. To investigate the current efficiency, the cell was emptied and the anode side was inspected. The anode side contained approximately 9 grams of zinc, which is in very close agreement with the theoretical value expected for the charge passed. The zinc was placed in the electrolyte and the rate of spontaneous dissolving of the zinc was relatively slow. About 50% of the zinc was still observed after two hours, and some residual zinc remained after 72 hours. Furthermore, very little gassing at the anode or cathode was observed during the charging process. Most of the zinc formed granular nodules on the titanium anode and eventually plated on the face of the membrane, while the cathode appeared to be substantially free of deposits.

Thus, specific embodiments and applications of batteries with bifunctional electrolyte have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A battery comprising an acid electrolyte in which a compound provides acidity to the acid electrolyte and in which the compound further increases solubility of at least one metal ion as compared to the electrolyte without the compound, wherein the metal ion forms with a second metal, optionally in ionic form, a redox couple that provides current of the battery.

2. The battery of claim 1 wherein the compound is an organic acid.

3. The battery of claim 1 wherein the compound is an alkyl sulfonic acid or an amine sulfonic acid.

4. The battery of claim 3 wherein the compound is methane sulfonic acid or sulfamic acid.

5. The battery of claim 3 wherein the redox couple is $Pb^{4+}/Pb^0$.

6. The battery of claim 3 further comprising a cell with an anode and a cathode, and an anolyte reservoir and a catholyte reservoir in fluid communication with the cell.

7. The battery of claim 6 wherein the battery comprises a plurality of cells, and wherein at least some of the cells include a bipolar electrode.

8. The battery of claim 7 wherein the battery has a capacity of at least 10 kWh.

9. The battery of claim 1 wherein at least one of the metal ion and the second metal ion are selected from the group consisting of a cobalt ion, a manganese ion, a cerium ion, vanadium ion, a titanium ion, a lead ion, and a zinc ion.

10. The battery of claim 9 wherein the redox couple is $Co^{3+}/Zn^0$.

11. The battery of claim 9 wherein the redox couple is $Mn^{3+}/Zn^0$.

12. The battery of claim 9 wherein the redox couple is $Ce^{4+}/Zn^0$.

13. The battery of claim 9 wherein the redox couple is $Ce^{4+}/Ti^{3+}$.

14. The battery of claim 9 wherein the redox couple is $Ce^{4+}/Zn^0$.

15. The battery of claim 1 wherein the redox couple provides an open circuit voltage of at least 2.0 Volt per cell.

16. The battery of claim 1 wherein the battery is a secondary battery.

17. A secondary battery comprising:
an acid electrolyte in which a first and second metal, optionally in ionic form, form a redox couple that produces current provided by the battery;
wherein the electrolyte comprises an alkyl sulfonic acid or an amine sulfonic acid; and
wherein the redox couple is $Pb^{4+}/Pb^0$.

18. The secondary battery of claim 17 wherein the alkyl sulfonic acid is methane sulfonic acid, and wherein the amine sulfonic acid is sulfamic acid.

19. The secondary battery of claim 18 further comprising a cell with an anode and a cathode, and an anolyte reservoir and a catholyte reservoir in fluid communication with the cell.

20. The secondary battery of claim 19 wherein the battery comprises a plurality of cells, and wherein at least some of the cells include a bipolar electrode.

* * * * *